May 25, 1965     M. B. HORNAK ETAL     3,184,945
METHOD AND APPARATUS FOR HOT PRESSURE
FORMING AND BACK EXTRUDING Filed March 29, 1962     5 Sheets-Sheet 1

INVENTOR.
Michael B. Hornak,
BY John G. Klein,
John H. Leonard,
their ATTORNEY.

INVENTOR.
Michael B. Hornak
BY John S. Klein,
John H. Leonard,
their ATTORNEY.

INVENTOR.
Michael B. Hornak &
BY John G. Klein,
John H. ......
their ATTORNEY.

May 25, 1965    M. B. HORNAK ETAL    3,184,945
METHOD AND APPARATUS FOR HOT PRESSURE
FORMING AND BACK EXTRUDING
Filed March 29, 1962    5 Sheets-Sheet 5

PRIOR ART

INVENTOR.
Michael B. Hornak &
BY John G. Klein,
John H. Leonard,
their ATTORNEY.

United States Patent Office 3,184,945
Patented May 25, 1965

3,184,945
METHOD AND APPARATUS FOR HOT PRESSURE FORMING AND BACK EXTRUDING
Michael B. Hornak, South Euclid, and John G. Klein, Euclid, Ohio, assignors to The Brush Beryllium Company, Cleveland, Ohio, a corporation of Ohio
Filed Mar. 29, 1962, Ser. No. 183,580
6 Claims. (Cl. 72—256)

This invention relates to a method and apparatus for hot pressure forming and back extruding of metal billets into preselected shapes and particularly to the hot pressure forming and back extruding of metals which have insufficient ductility, as measured by tensile elongation, for substantial reduction throughout their respective ranges of forming temperature. These metals are those that exhibit a decreasing ductility from a minimum forming temperature to a maximum practical forming temperature and which are exceedingly difficult to form by conventional methods due to the formation in the metal of fractures and micro-cracks and the like, particularly near the extremities or peripheries of the resultant formed piece. Typical of such metals are beryllium and beryllium rich alloys.

Heretofore, beryllium has been forged between dies into relatively thin flat shapes, such as discs and plates. For this purpose, the billets are encased in a frame of metal frame members which are coated with a parting agent, and which frame embraces the entire peripheral edge of the billet. Generally, because of oxidation, the billet faces also are covered by mild steel plates, these being welded onto the top and bottom surfaces of the frame, and being substantially coextensive with the outer periphery of the frame. While thus jacketed, the heated billets are pressed between the planar forming surfaces of a punch, or ram member and die.

As a result of the pressure developed, the beryllium metal flows and causes the frame and the steel plates to deform in a direction parallel to the die surfaces, which direction is directly transversely of the relative path of movement of the die and ram member and parallel to the plane of the frame. Since the enclosing frame is peripherally continuous it is, of itself, operative to restrain the billet and metal therein, in the plane of the frame to movement which is due to outward deformation of the frame in its plane. The billet metal is constrained from movement out of the frame normal to the plane of the frame by the ram member and die. Under these conditions bodily movement of shifting of the frame laterally of the direction of application of pressure presents no problem. The billet metal, since it is confined in all directions of elongation of the frame members by the tensile forces inherent in the surrounding frame members, distributes the force transferred from the ram member to the frame by the billet metal equally in balanced relation in all directions so that there is no component tending to shift the frame in its plane. The peripherally confining frame reduces the production of micro-cracks and fractures near the periphery of the resulting forging almost to the point of elimination. This procedure was subsequently modified slightly to form shallow spherical segments during the formation of which the flow of the forged metal is predominantly transversely of the path of the dies. Due to the frame embracing the entire periphery of the billet, it is self-sustaining and by its deformation and resultant expansion by the billet metal, permits the flow of billet metal transversely of the path of movement of the ram member and die.

In each of these prior methods, the resultant forgings are upset forgings and do not involve back extrusion.

They are limited in shape to flat or slightly dished forgings suitable only in a limited field. However, it was recognized that the field of use of the metal could be greatly increased if it could be pressure formed into cup-shape with a relatively deep rim of structural thickness, or if it could be pressure formed into cylindrical or frustoconical shells and the like.

For this purpose, the prior method and apparatus of forging flat shapes and shallow spherical segments cannot be employed successfully. The pressure formation of billets into cup, or shell, or sleeve shapes requires a female die having an open end cavity and a punch or ram member receivable in the cavity through the open end but with substantial space between the entire peripheral surface of the ram member and the inner peripheral wall surface of the cavity so that the metal of the billet, when placed under pressure by the ram member, can be made to flow so as to fill the lower portion of the cavity beneath the end of the ram and then extrude back between the peripheral surfaces by the pressure applied on the metal by the ram member and thus pass upwardly into the space to form the rim of the cup-shape workpiece or the wall of the cylindrical shell, as desired.

Accordingly, the use of a peripherally closed frame which, during pressure forming of the billet by the ram and die members, remains in embracing relation to the entire peripheral edge of the billet, and hence is self-sustaining with respect to the hydrostatic pressure developed by the billet in the plane of the frame upon application of the ram member to the billet in the die, cannot be used where the pressure forming is accompanied by back extrusion of part of the billet metal between the ram member and the die cavity wall.

In the present instance, involving pressure forming and back extrusion, the restraint of flow of metal edgewise of the original billet is effected by the walls of the die cavity after the billet has been partially deformed. The problem is to restrain the movement of the metal of the billet as it is back extruded and caused to flow upwardly between the peripheral walls during the insertion of the ram under pressure into the cavity.

In accordance with the present invention, this is accomplished by a restrainer which is arranged on the peripheral margin of the billet at the face facing toward the open end of the die cavity. Either on the die or ram member, means are provided which engage a portion of the restrainer and constrain it from bodily movement in a direction toward the open end of the die by the pressure of the metal. The restrainer is made of a metal which, when heated to a proper temperature, usually that of the billet, is capable of being deformed by the pressure developed in the billet metal, by the force exerted on the metal in the cavity by the ram member, in a direction away from the base of the die cavity. The restrainer is arranged so that the billet metal rising or back extruding in the cavity transfers the hydrostatic pressure of the metal to the restrainer and thereby causes the metal of the lower face of the restrainer to move upwardly due to deformation of part of the restrainer thereabove by the pressure of the billet metal.

In some cases, this upward movement of the face of the restrainer originally engaging the billet is by such distortion upwardly of the restrainer that the lower face becomes downwardly concave, and the restrainer itself forms, in part, the outer strata of the jacket at the upper margin of the rim of the resultant workpiece. The specific manner in which the deformation of the restrainer occurs, however, is dependent to some extent on the type of article being formed, the important feature being that the restrainer be constrained against bodily movement toward the open end of the cavity therein the space between the peripheral walls of the ram member and die cavity, and that the movement of the lower face of the restrainer be limited to that created by deformation of the metal of the restrainer under the pressure exerted by the metal of the billet as it is back extruded from the lower part of the cavity.

As a result of this operation, beryllium billets can be forged into cup-shape workpieces having side walls of structural thickness, as distinguished from mere flash metal incidentally entering spaces provided solely for operating clearance between a ram member and die. However, aside from this limitation, the side walls may be relatively thick or thin, depending on requirements in the finished article. Usually they are thick enough to be ground or machined to remove the outer and inner strata.

The workpieces, after cooling, are cleaned and pickled, and the superficial strata are removed, providing a final article which is in sound metallurgical condition and free from fractures throughout.

Further, by moving the ram member into the die to a sufficient degree, the cup can be made with a bottom of very slight thickness so that the resultant forging can readily be machined into a cylindrical or frusto-conical shell, or a shell of other configuration.

In accordance with the present invention, the billets can be formed in a jacket or without a jacket. Formation in a jacket is used generally at temperatures at which excessive oxidation results.

Various objects and advantages will become apparent from the following description, wherein reference is made to the drawings, in which:

FIGS. 21 and 22 are a diagrammatic top plan view, partly in section, and a vertical sectional view, respectively, illustrating a method, known in the prior art, of forming shapes of beryllium by forging; FIG. 22 being taken on line 22—22 of FIG. 21, showing jacketed billet between ram and die members at the beginning of the forging operation;

Figure 1:
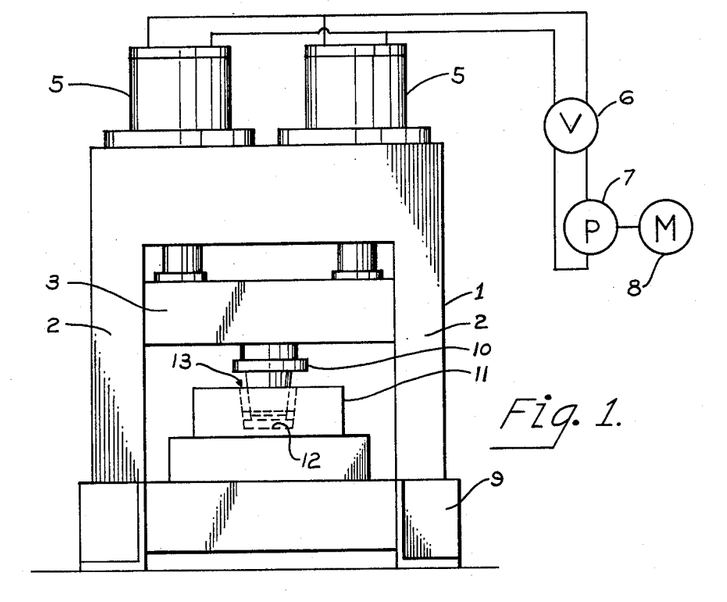
FIG. 1 is a front elevation of a conventional power driven press with the apparatus of the present invention in position for operation thereby.

Referring to FIG. 1, a die and restrainer combination for practising the method is illustrated, and is to be used in connection with a conventional hydraulic press, such as indicated generally at 1, having upright frame members 2 between which a suitable ram 3 is mounted and guided for vertical reciprocation. The ram is powered by a suitable hydraulic piston and cylinder assemblages 5, controlled by a conventional valve 6 and supplied by pressure fluid by a conventional hydraulic pump 7 driven by a motor 8, all in the well known manner. This press 1 has a bed 9 on which the apparatus of the present invention is supported during the pressure forming operation.

The apparatus comprises essentially the punch or ram member 10 mounted on the ram for reciprocation therewith. A complementary female die 11, having a cavity 12, open at the top as indicated at 13, is supported on the bed 9 for reception of the ram member 10 through its open top.

Figure 2:
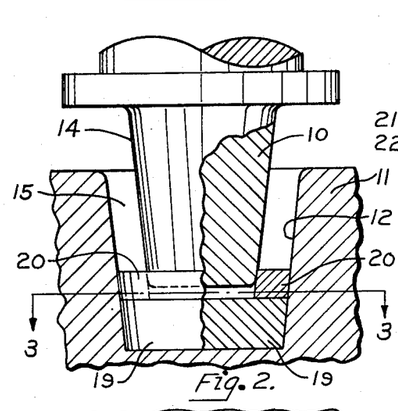
FIG. 2 is a fragmentary front elevation of the apparatus of the present invention, part thereof being shown in section, as indicated by the line 2—2 in FIG. 3, the position of the die and ram members being at the initiation of the forging operation.
Figure 3:
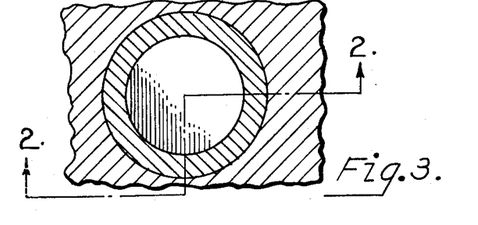
FIG. 3 is a horizontal sectional view taken on the line 3—3 in FIG. 2.
Figure 4:
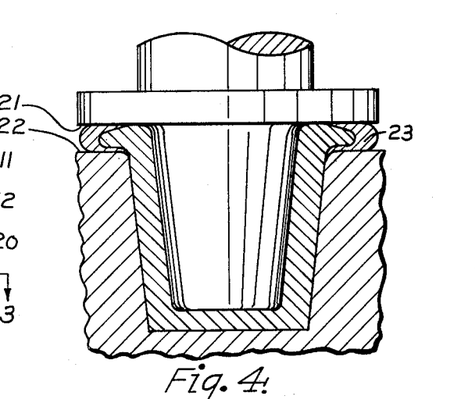
FIG. 4 is a view similar to FIG. 2 showing the billet and the position of the die and ram members, at the end of the forging operation.

Referring to FIGS. 2 through 4, the die cavity 12 shown for illustration is one which is frusto-conical, with its smaller base disposed downwardly. The ram member 10 is frusto-conical with its smaller base disposed downwardly. The ram member is mounted on the ram so that upon downward movement of the ram it enters the open end of the die cavity 12 and proceeds toward the bottom of the cavity. The ram 10 has a peripheral wall 14 which preferably is circular in cross section and, in the form illustrated, is frusto-conical. The cross sections of the die cavity and the ram member are such that, as the ram member enters the die cavity and proceeds toward its final position, the peripheral wall of the ram member is at all times spaced inwardly a substantial distance from the peripheral wall 12 of the cavity. This spacing, it is to be understood, is not a mere operating clearance, but is a spacing greatly in excess of that required merely for operating clearance, and is designed to define an annular space 15 of substantial width radially and extending from the base of the ram member at its lowermost point of insertion upwardly an amount many times the thickness of the base or space, and generally, close to the open end of the cavity. This peripheral annular space is to define the sidewalls of structural thickness so that cup-shaped members or cylindrical shells of substantial wall thickness can be formed by back extrusion of the metal of the billet in the die cavity.

The walls, as mentioned, are of structural thickness, as distinguished from flashing and the like which might incidentially enter into normal operating clearance spaces between a die member and ram. The radial dimension of the annular space 15 depends upon the article desired, but is a minimum such that structural peripheral walls useful in the finished article are provided. Generally, these walls are sufficiently thick to permit machining or grinding off of strata of substantial thickness both internally and externally. It is apparent that if the ram member 10 is forced downwardly in the die against the billet of heated metal therein, the metal will tend to back extrude into the annular space between the ram and die members, thus pressure forming and back extruding into a cup-shape having a bottom wall between the bottom of the ram member and the base of the die cavity and a peripheral wall or rim resulting from filling the space 15.

With ordinary steels and like metals, nothing more in the way of apparatus would be required. However, in the case of beryllium or other metals such as heretofore mentioned, if beryllium billets, as indicated at 19, are disposed on the base of the cavity and the ram member is inserted, the billet metal tends to flow into the space 15. Due to the nature of the metal, the resulting cup-shaped member would contain numerous micro-cracks and splits or fractures appearing therein. Under even the best conditions, the side wall of the cup-shaped workpiece formed as a result of the beryllium being back extruded into the space 15 would be so filled with micro-cracks and fractures and the like that it would be substantially useless for the intended purpose, or at best it would require the machining away of so much beryllium metal that the method would be yieldably impractical. It becomes necessary, therefore, to restrain metals, such as beryllium, during their counter flow or back extrusion under the force of pressure of the ram and die members.

As mentioned heretofore, the restraint required in prior methods is to prevent the flow of the beryllium laterally of the direction of the applied force, and for this purpose a peripherially closed frame can be used in surrounding relation to the peripheral edge of the billet, such frame being continuous. The pressure exerted against it is radially of the frame, and the frame, without being subjected to forces which would displace it bodily, can apply and maintain a restraining force on the metal of the billet as the metal is urged to flow laterally of the direction of the pressure applied by the ram member during forging.

In accordance with the present invention, the die cavity is an adequate restrainer for the flow in the direction laterally of the applied force of the ram member, and the problem is to maintain yieldable restraint on the metal in a direction opposite to the force applied by the ram member: for example, in the present instance, toward the open end of the die cavity as the metal is extruded back and opposite to the direction of movement of the ram toward the open end of the die into the space 15.

For this purpose, a restrainer 20 is provided. This restrainer may be a circumferentially closed member, such as an annular frame, but it must be arranged to restrain the flow of the metal in a direction of the axis of the frame instead of transversely thereof. As a result, the restrainer cannot be inherently restraining by being in continuously surrounding relation to the billet. Instead, the restrainer 20 must be arranged at the face of the billet which, during formation of the workpiece, faces toward the open end of the cavity. Thus, it engages at that face the peripheral margin of the portion of the billet aligned with the space 15. As a result, during application of the force of the ram member, the metal of the billet fills the cavity and is back extruded against the restrainer 20 and urges it upwardly into the peripheral space 15. With the pressure of the metal applied in this direction, an annular frame cannot be self-restraining as in the case of a peripheral frame. Instead, it is necessary that it be constrained from bodily movement by other means. This restraint must be provided by means other than the inherent restraint in the enclosing frame hereinbefore described.

Preferably, this is accomplished by effecting an interlocking relation between the restrainer and the peripheral walls of the ram member and cavity.

In the form illustrated in FIGS. 2 through 4, this interlocking relation is obtained by engagement of the inner periphery of the restrainer 20 by the peripheral wall of the ram member 10 with sufficient force to prevent the bodily movement of the restrainer into the space 15 and toward the open end of the die. For example, the peripheral wall 14 of the ram member 10 may be tapered toward the base of the cavity. The restrainer is of a metal which, when heated to the proper temperature, usually that of the billet, can be distored by the hydrostatic pressure of the billet metal, built up by the application thereto of the ram member, so that its inner face overlying the peripheral margin of the upper face of the billet can be caused to move upwardly into the space 15 as a result of the deformation of the retainer metal, rather than bodily displacement of the restrainer.

As the ram member continues its aproach toward the base of the cavity, the metal of the billet is extruded back up into the space 15 against the yieldable resistance of the restrainer. In FIG. 4, the effect of the combination of the constraint, by the peripheral walls of the ram member and cavity wall, of the restrainer from bodily movement toward the open end of the cavity and the hydrostatic pressure in the cavity is illustrated. These effects cause the constrained restrainer to bow upwardly, between its lateral edges so as to become concave at its underface between the peripheral walls, and to deform by stretching upwardly into the space. Thus a portion of the restrainer forms, along a portion of the peripheral walls overlying the billet metal, a thin skin.

If the ram member continues to move far enough into the die, the upper edge of the formed workpiece, covered by the metal of the restrainer, extrudes out of the cavity. When desired, the ram member may be provided with an auxiliary forming face 21 aligned with an auxiliary forming face 22 on the female die about the open end of the cavity. With this arrangement, the uppermost margin of the cup-shaped billet material, clad at the upper portion in metal of the restrainer, is pressure formed into an annular radially extending flange 23 at the open end of the workpiece.

Figure 5:
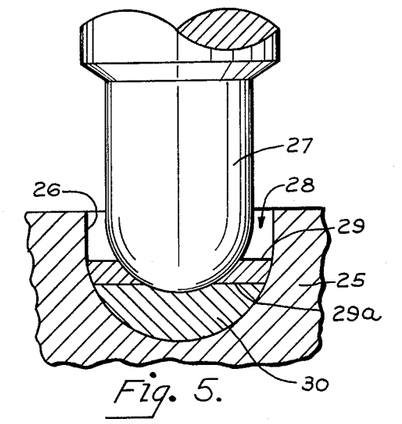
FIG. 5 is a diagrammatic fragmentary vertical sectional view, similar to FIG. 2, illustrating the formation of a modified shape of forging, the position of the ram member and die member being shown at the initiation of the forging operation.
Figure 6:
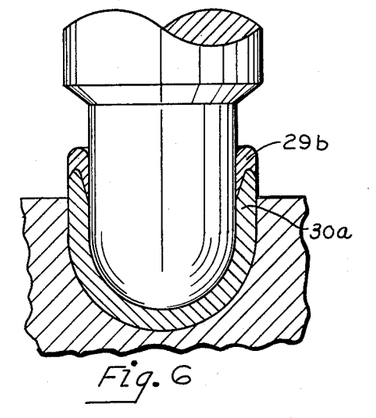
FIG. 6 is a view, similar to FIG. 5, showing the billet and the position of the members at the completion of the forging operation.

FIGS. 5 and 6 illustrate an operation similar to that disclosed in FIGS. 2 through 4 for producing a differently shaped workpiece. This operation employs a female die 25 having a cavity 26, of which the lower end is in the form of an upwardly concave spherical segment and an upper portion which is cylindrical, or is circular in cross section and slightly flaring outwardly upwardly. A ram member 27 correspondingly shaped but of smaller diameter, for forming an article of which there are walls of uniform thickness or varying thickness, is arranged to enter the die cavity in spaced relation to its peripheral inner wall, thus defining an annular forming space 28. A restrainer 29 is arranged to bridge across the lower end of space 28 between the periphery of the ram member and cavity wall and has a portion 29a extending under the ram member 27 to assist in restraining the restrainer. Since the restrainer engages the under side of the ram member at the spherical portion where it is increasing in diameter upwardly, the restrainer is constrained by the ram member from bodily movement upwardly into the space 28. Therefore, the restrainer yieldably restrains back extrusion of metal of the billet 30 as the billet is compressed in the cavity. As before, the restrainer permits movement of the material of the billet into the space 28 by deformation of the restrainer, until the billet metal and restrainer assume a final position such as illustrated in FIG. 6, wherein the back extruded portion of the billet is indicated at 30a and of the restrainer as indicated at 29b.

Figures 7, 8, 9:
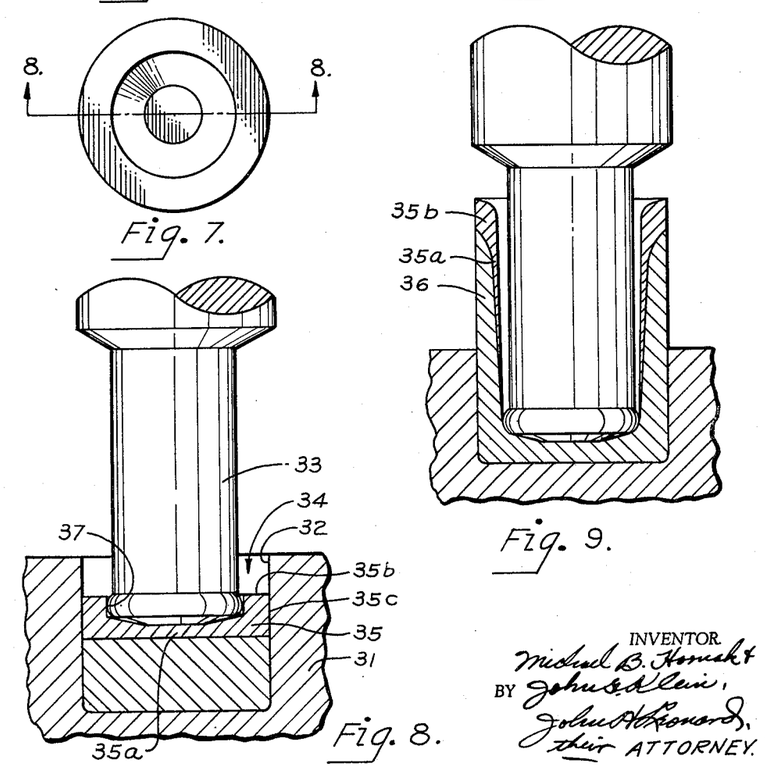
FIG. 7 is a top plan view of a modified billet and restrainer assembly used in the present invention.
FIG. 8 is a vertical sectional view taken on line 8—8 of FIG. 7.
FIG. 9 is a vertical axial sectional view of the billet, and restrainer of FIGS. 7 and 8, the ram and die members, at the completion of the forging operation.

Referring to FIGS. 7 through 9, a modified type of restrainer is illustrated. As there shown, a female die 31 having a cylindrical open top cavity 32 is provided. It is understood that though the peripheral wall of the cavity is, in effect, cylindrical, it increases in diameter very slightly from bottom to top so as to provide a slight draft for facilitating removal of the formed billet metal. A ram member 33 which may, if desired, be cylindrical, is arranged to enter the cavity in spaced relation to the cavity walls to provide a space 34 therebetween for forming part of the billet metal. A restrainer 35, in the form of a plate 35a, having a thickened rim 35b at its outer periphery in position for alignment with the space 34 is provided. Since the ram member 33 is cylindrical, it would ordinarily be difficult to withdraw from the forging. To eliminate such difficulties, and provide a constraining means, the ram is provided near its lower end with a small annular bulge or bead 37 which is of slightly greater external diameter than the external diameter of the remainder of the ram member. The bead 37 may be just sufficient to fit within the annular rim 35b of the restrainer, or it may be of such diameter that it enters within the rim 35b with a press fit which partially expands the rim. The rim 35b may be integral with the plate 35a or may be bonded thereto by welding and the like. As the ram 33 descends, the plate portion 35a of the restrainer 35, engaged by the inner end of the ram member 33, prevents the rim 35b from moving bodily upwardly in the space 34. Thus by cooperation of the bead 37 and the inner end of the ram member 33 with the heated restrainer, the restrainer and its heated rim are constrained from bodily movement into the space 34, but the metal of the rim 35b is deformed by the hydrostatic pressure of the heated billet metal and yieldably restrains the back extrusion of the billet metal into the space 34, as heretofore described.

In the example shown for illustration in FIG. 8, the diameter of the strainer at the outer periphery of the rim 35b is two and one-half inches and the billet is of the same diameter and about an inch thick. The billet is pressure formed and back extruded into a cup-shaped workpiece 36 such as illustrated in FIG. 9 which is about three and one-quarter inches long, from its base to the upper edge of the displaced metal of the restrainer 35. The outside diameter is about two and one-half inches and the inside diameter is about two inches, thus leaving the side wall about a quarter of an inch thick.

It will be noted that the metal of the plate 35a which originally was within the rim 35b is distributed along the inner face of the finished workpiece 36 from the lower end of the ram member 33 upwardly to the upper end. This restrainer metal is very thin at the lower end of the workpiece and becomes progressively thicker toward the upper end of the workpiece. The rim 35b overlies the upper end, being partially deformed so that part of its metal is drawn downwardly along the inside of the workpiece 36 due to the restraint afforded by the deforming metal of the plate 35a of the restrainer 35.

With this arrangement, a workpiece in the form of a relatively deep, thick-walled cup member is provided.

In the forms of the invention thus far disclosed, the billet is shown as being unjacketed, but it may be jacketed, if desired.

Figure 10:
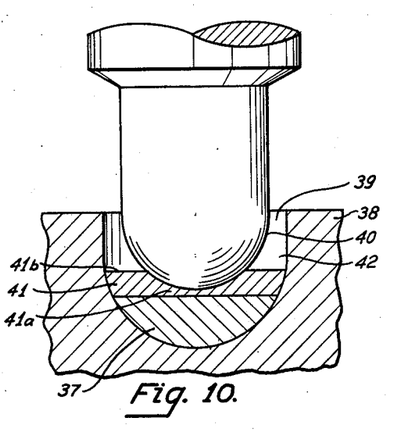
FIGS. 10 and 11 are diagrammatic fragmentary vertical sectional views of another modified billet, restrainer, and ram and die members used in the present invention, and illustrating them at the beginning and end of the forging operation, respectively.
Figure 11:
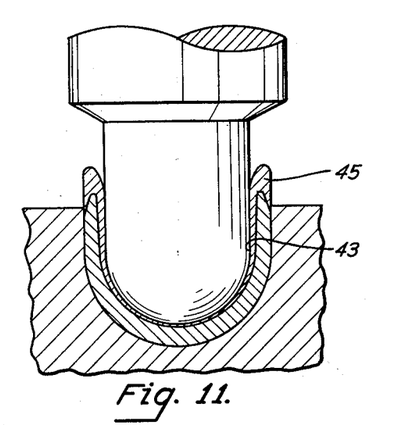

In FIGS. 10 and 11, a billet 37 is pressure formed into a cup-shaped workpiece having a spherical bottom portion joining the smaller base of a frusto-conical side wall which extends upwardly therefrom. A female die 38 having a cavity 39 receives a ram member 40 under pressure and in spaced relation to the cavity side wall. A restrainer 41 is laid over the top of the billet 37. The restrainer 41 has a thin wall portion 41a extending beneath the ram and a thick rim portion 41b which bridges the space 42 between the ram member and cavity wall. The rim portion 41b extends part way down beneath the lower margin portion of the ram and merges with the portion 41a so that the restrainer underlies the entire end surface of the ram member. When pressure is applied by the ram member to the heated billet and restrainer, the billet metal is back extruded, as illustrated in FIG. 11, the metal of the restrainer forming a layer or skin 43 on the interior wall of the formed workpiece, with a substantial amount of the restrainer rim metal, as indicated at 45, disposed at the upper margin of the workpiece and encasing that margin.

Figure 12:
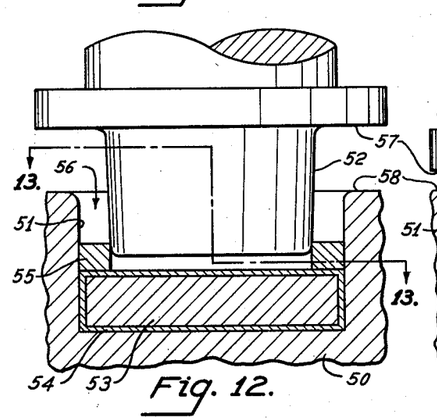
FIG. 12 is a diagrammatic vertical sectional view, similar to FIG. 2, illustrating a modification of the invention wherein the billet is jacketed, and showing the die and ram members shortly after the initiation of the forging operation, and is taken on line 12—12 of FIG. 13.
Figure 13:
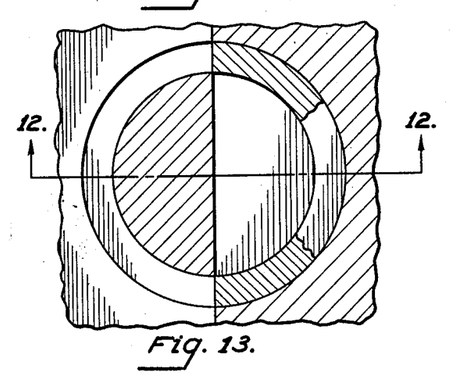
FIG. 13 is a horizontal sectional view taken on the line 13—13 in FIG. 12.
Figure 14:
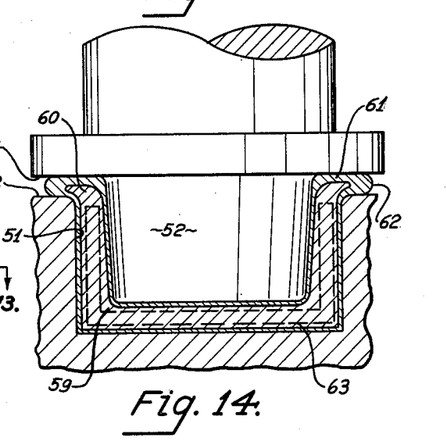
FIG. 14 is a view similar to FIG. 12 showing the position of the members and condition of the billet at the completion of the forging operation.

Referring next to FIGS. 12 through 14, a die 50, having a cavity 51 for cooperation with a ram member 52 are provided. The ram member and die cavity both may be slightly tapered downwardly for draft for easy withdrawal of the finished product. A billet 53 is jacketed completely in a jacket 54 of soft steel. The jacket is welded at its joints so as to form an air tight capsule which encloses the billet both at its upper and lower surfaces and about its entire peripheral edge. A suitable vent for permitting gases to escape may be provided in the jacket if desired. The billet may be coated with some type of parting agent preparatory to jacketing. The jacketed billet is then provided at its upwardly facing peripheral margin with a restrainer 55 in the form of a metal annulus.

The ram member 52 may be cylindrical with a small annular bead extending outwardly at the lower end as hereinbefore described, in which case the restrainer 55 should be welded to the jacket of the billet so as to assist in constraining it from bodily movement into an annular space 56 between the ram member and the wall of the die cavity. On the other hand, if the ram member is tapered downwardly, then the peripheral surface of the ram member cooperates with the restrainer for constraining the restrainer from passing upwardly bodily through the space 56.

In either event, upon downward movement of the ram, the back extrusion of the billet metal deforms the restrainer and results in forcing the billet metal and part of its jacket upwardly into the space 56 and, at the same time, forcing the under surface of the restrainer 55 upwardly thereinto. The ram member 52 has a downwardly facing forming face 57 overhanging an upwardly facing forming face 58 on the female die. When the ram member is fully inserted, the billet metal takes the shape as illustrated in FIG. 14, wherein the metal of the jacket 54 is drawn up into the passage 56 overlying both the inner and outer walls of the formed billet material. This produces a cup-shape workpiece 59. The metal of the restrainer 55 is deformed also so that a portion of the billet metal in the finished workpiece extends upwardly above the top of the die cavity and is encased by metal of the restrainer. Thus, part of the metal of the formed workpiece is above the top of the cavity, as indicated at 60, as is also part of the deformed restrainer, as indicated at 61. These portions are engaged between the surfaces 57 and 58 of the ram member and die member, respectively, and are forged in the form of an outwardly flaring flange as illustrated at 62.

In FIG. 14, the shape of the finished product, after machining away excess material of the workpiece 59, is indicated by dotted lines 63. In the workpiece shown for illustration, the outer diameter of the jacketed billet and its restrainer ring are 11.03 inches in diameter. The restrainer is 1.24 inches thick, axially, and is 8.22 inches in inner diameter. This restrainer is in the form of a mild steel ring. The jacketing material is 0.25 inch thick and of mild steel, except for the top portion, which is about 0.31 inch thick. The overall height of the jacketed billet is 2.84 inches, not including the restrainer. The outside diameter of the billet material itself is 10.5 inches.

After forging, the flange 62 has an outer diameter of 13⅜ inches, and a thickness of ½ inch at its periphery. The inside diameter of the jacketed workpiece at the top is 8¾ inches at the inside of the restrainer.

The metal of the jacket on the inside surface of the workpiece draws down to about ⅛ of an inch toward the upper end of the workpiece. On the outer face it draws down to about ⅛ of an inch at a central portion between the upper and lower ends, but retains substantially its original ¼ of an inch thickness above and below the central portion. The height of the finished workpiece from the top of the flange 62 to the base, is about 6 9/16 inches. The jacket thickness inside the base reduces to 3/16 of an inch. On the outside of the base it retains its ¼ of an inch thickness.

The dimensions vary materially, depending upon the article desired and the temperatures used.

In all cases herein described, however, the restrainer is such that it can be deformed by the hydrostatic pressure of the billet metal at the temperature provided, and usually at the temperature of the billet, or billet and jacket, as the case may be.

Figure 15:
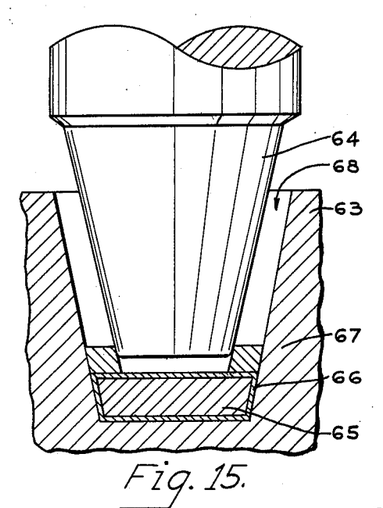
FIGS. 15 and 16 are diagrammatic fragmentary vertical sectional views similar to FIG. 2, illustrating the forging of a cup of frusto-conical shape from a jacketed billet, the positioning of the die and ram members, jacket, restrainer and billet being shown in FIG. 15 at the initiation of the forging operation and in FIG. 16 at the completion of the forging operation.
Figure 16:
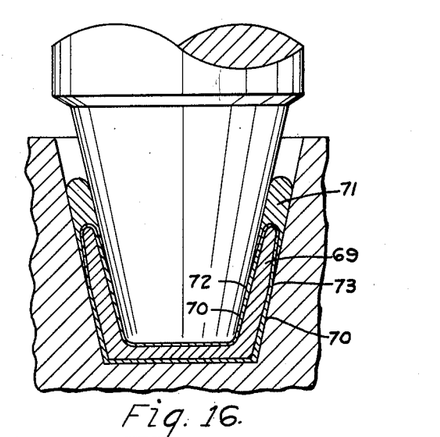

In FIGS. 15 and 16, there is illustrated the formation of a frusto-conical cup-shaped member. In this case, a female die 63 having an open top cavity, which is frusto-conical with its larger base upwardly, receives a ram member 64, which is correspondingly shaped. A billet 65 having a jacket 66 is placed in the cavity together with a restrainer 67. The restrainer 67 is prevented from bodily movement out of the annular space 68 between the ram member and cavity wall due to the downward taper of the outer wall of the ram member, which taper is that of the cavity wall. In this form, the die cavity is sufficiently deep so that the metal of the billet is extruded partially thereinto, the extruded billet metal being indicated at 69 in FIG. 16. The jacketed billet takes the form indicated at 70, and the restrainer takes the form indicated at 71, a small portion or thin skin thereof remaining on the inner and outer walls of the jacket, as indicated at 72 and 73.

Figure 17:
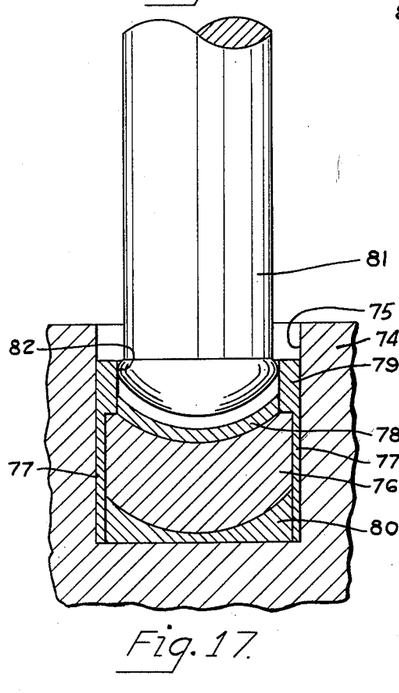
FIGS. 17 and 18 are diagrammatic vertical sectional views illustrating a modification of the invention wherein both the interior and exterior walls of the forging are cylindrical, the ram and die members, jacketed billet and restrainer being shown at the initiation of the forging operation in FIG. 17 and at the completion of the forging operation in FIG. 18.
Figure 18:
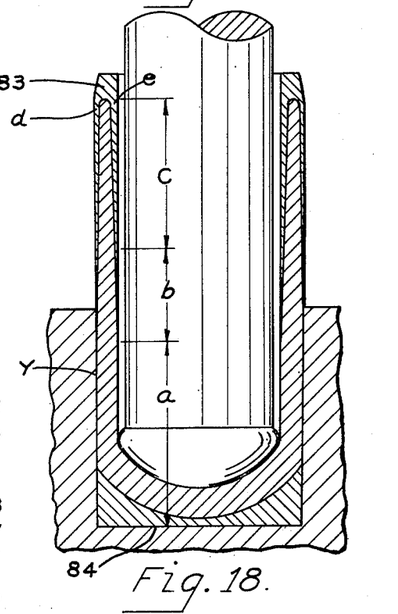

Referring next to FIGS. 17 and 18, a female die 74 having a cylindrical cavity 75 is provided, the cylindrical cavity having a very slight draft upwardly for ease in removal of the finished workpiece. The billet 76 is jacketed in side walls 77, with a top wall 78 which latter wall also acts as a part of the restrainer. This top wall 78 is relatively thick and has, at its outer periphery, a rim 79 which may be integral therewith or welded thereto. In the form illustrated, the rim 79 also forms part of the jacket at the upper surface of the billet. The rim 79 and top wall 78 provide the restrainer. In order to assist the flow of billet metal, the base of the jacket, as indicated at 80, is provided with an upwardly concave spherical surface.

A ram member 81 is provided. It is cylindrical and has a slight annular bead 82 at its lower end to enter into the rim 79 and to provide an internal diameter in the finished workpiece slightly greater than the diameter of the ram member above the bead 82 so that the plunger can be readily removed.

Upon application of pressure on the ram member, and its movement into its final position, the billet is back extruded into a closed-end cylindrical workpiece, as best illustrated in FIG. 18. In this back extrusion, it is to be noted that the wall 78 of the jacketing material and the rim 79 are drawn out to some extent along the inner and outer peripheral walls of the workpiece, beginning about ⅓ of the distance from the base, as indicated at y, and continuing with increasing thickness entirely to the top. A part of the rim metal is disposed above the top, as indicated at 83. The thickness of the jacketing material on the inside of the workpiece is about 0.002 of an inch for about ⅖ of the height from the bottom at 84, as indicated at a, and about 0.003 of an inch thick for the next fifth of height thereabove, as indicated at b, and thereafter graduating from about 0.003 to 0.09 of an inch to the top of the workpiece for the portion indicated at c. At the outer face, near the top of the workpiece, the outer facing material of the rim metal, as indicated at d, is about 0.05 of an inch thick instead of 0.09 inch, at e.

The inside diameter of the jacketed workpiece at the top is 11 17/32 inches. The thickness of the metal on the inner face of the bottom, resulting from the wall 78, is about 0.002 inch thick. The outside diameter of the jacketed workpiece is about 13½ inches.

Figure 19:
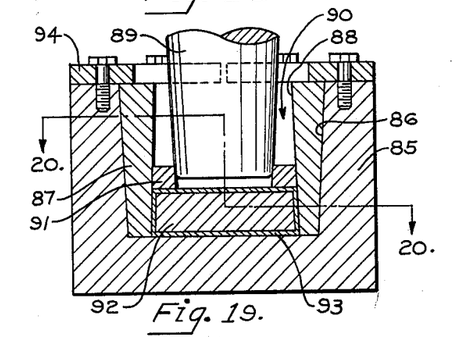
FIG. 19 is a fragmentary diagrammatic vertical sectional view showing a modification of the invention wherein the restraining means for the billet is held in place both by the ram member and the die member and is taken as indicated by the line 19—19 in FIG. 20, the position of the members being shown at the initiation of the forging operation.
Figure 20:
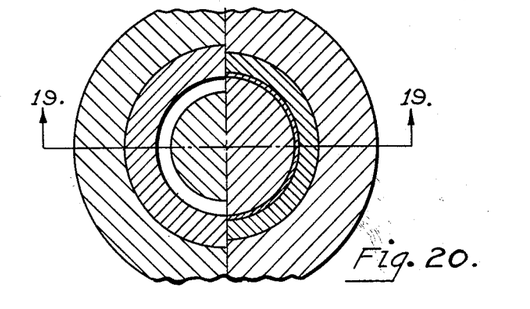
FIG. 20 is a horizontal sectional view of the structure illustrated in FIG. 19, and is taken on the line 20—20 thereof.

Referring next to FIGS. 19 and 20, a die member there shown is one which is arranged so that the die walls constrain the restrainer from bodily movement out of the space between the die cavity walls and ram member. As there illustrated, a die member 85 is provided and has a bore 86 in which is received a split annular liner 87. The annular liner fits the bore and has its inner face arranged so that it forms the inner peripheral wall of a die cavity 88. The annular liner 87 tapers at both its outer face and its inner face downwardly toward the base of the cavity so that it can readily be removed from the bore and the workpiece can readily be removed from it after the forming operation.

A ram member, as indicated at 89, is provided and enters the cavity in spaced relation so as to provide an annular space 90 between the walls of the ram member and cavity, and may be cylindrical, or tapered, as desired. If it is cylindrical, the die alone constrains the restrainer from moving bodily out of the peripheral annular space 90. A restrainer 91 is disposed on the upper margin of a jacketed billet 92 having a jacket 93. If desired, the restrainer may be bonded to the jacket, but in view of the fact that it is to be restrained by the dies, this is unnecessary. The liner 87 is secured in place by an annular lining ring 94 bolted onto the top of the die member 85.

The pressure forming and back extrusion operation proceeds as heretofore, but after the completion, the ram member is removed from the workpiece and then the liner 87 is removed from the die cavity and it, in turn, removed from the workpiece.

In all cases in which the billet is jacketed, a parting agent is generally employed between the jacketing material and billet. The jacket is used primarily to prevent excessive oxidation of the billet at forming temperatures.

After formation of the workpiece, the jacket is cut off, the billet cleaned by washing, and then pickled, after which the requisite amount of surface strata are machined or ground off to provide the finished article.

The temperatures employed vary with the particular billet material. With metals such as beryllium, its alloys, and some other metals, there is a temperature range in which ductility is optimum. Generally, below this range, the ductility is reduced from that existing within the range, and above this range it also is reduced.

Usually the heating is such that the billet at the time of the forming is within the minimum and maximum practical forming temperature range, the jacket and restrainer being correspondingly heated. The billet is jacketed and the ring bonded thereto or laid thereon, the assembly is heated as a unit so that all portions are at the required temperature. The die member and ram member also may be preheated. An example of a temperature that is effective for forming of beryllium in this manner is about 1500° F.

The method and apparatus herein disclosed is not to be confused with a method and apparatus such as disclosed in Gero Patent No. 1,685,915 of October 2, 1928. In that patent, upset forging only is employed, the resultant forging being a cylinder of less length and greater diameter than that of the billet with which the operation was begun. In that operation, the metal to be upset is enclosed in a relatively soft metal which, during the upset, might or might not flow to a certain degree as flash into the operating clearance space provided between the peripheral wall of the ram member and the inner peripheral wall of the die cavity. However, any such flow is of the encasing metal and in the form of flash, and incidental to the operation. None of the metal of the billet which is to form the finished forging is caused to flow into such space, and the operating clearance is not sufficient to provide a wall of structural thickness, even though the metal should be caused to flow thereinto.

The present method is not a simple upset forging operation, but a pressure forming operation involving upset forging combined with back extrusion of the billet metal into the space between the peripheral wall of the ram member and wall of the die cavity. This back extruded billet metal is of structural thickness, that is, a thickness sufficient to fill such a peripheral space having a width greater than that which could be sealed by the back extruded billet metal itself upon its normal cooling by contact with the ram and die members during the normal forming operation, and thus requiring restraining means other than chilled metal of the billet to hold the metal in the space under the forming pressure.

In order to fully appreciate the differences over the prior art, two examples of the prior art are illustrated in FIGS. 21 through 25.

Figure 21:
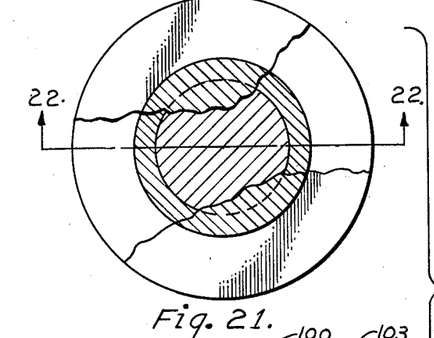
Figure 22:
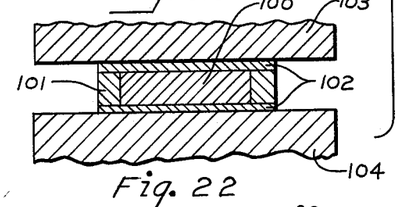
Figure 23:
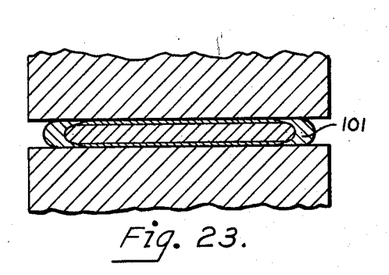
FIG. 23 is a view similar to FIG. 22 showing the same structure of FIGS. 21 and 22 at the end of the forging operation.

Referring first to FIGS. 21 through 23, a forging operation, hereinbefore referred to, by which billets are hot forged into discs is illustrated. A billet 100, embraced at its peripheral edge by the peripherally continuous mild steel frame 101 is employed. The billet is clad at the top and bottom by mild steel plates 102 which are welded to the frame 101. The billet is laid between coplanar forming surfaces of a ram member 103 and a platen member 104. Upon the application of pressure, the metal of the billet is forged in the direction of application of pressure and thereby caused to flow laterally only of the direction of application of pressure; that is, parallel to the plane of the confining frame 101 and normal to the direction of application of applied force. In such relations it is apparent that the frame is in complete embracing relation to the edge of the billet and inherently restrains itself from bodily movement and constrains the metal to flow normal to the direction of applied force, and is not in a condition where it itself must be constrained from bodily movement in any manner. Upon application of pressure to the billet, the hydrostatic forces of the metal exert equal pressure in all directions outwardly against the inner periphery of the frame 101. Consequently, the frame remains in a balanced condition with no forces tending to shift it laterally. Generally, these billets are circular in the plane of the frame so that the frame 101 is an annulus of constant diameter.

Figure 24:
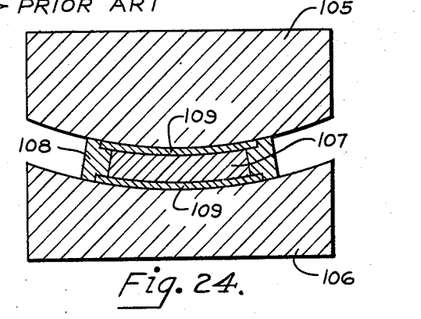
FIGS. 24 and 25 are views similar to FIGS. 22 and 23, showing the formation of shallow spherical segments in a like manner in accordance with a method of the prior art.
Figure 25:
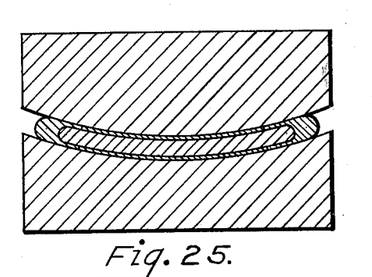

A slight modification of this procedure is employed, as indicated in FIGS. 24 and 25, wherein the forming faces of a ram member 105 and platen member 106 are made in the form of spherical segments of very shallow depth. In this form, also, a billet 107 is embraced about its peripheral edge by a frame 108 and is jacketed by the frame and plates 109. The jacketed billet is pressed between the forming faces with the result that the flow of the metal therebetween is substantially transversely of the direction of application of the force or in the plane of the frame. Again, there are no forces tending to shift the frame 108 in the direction of application of force by the ram member. Hence, again the frame does not tend to move bodily normal to its plane and does not have to be constrained from bodily movement during forging.

These prior art methods and apparatus are limited to flat, or slightly dished discs or plates and do not lend themselves to other operations.

It is apparent, therefore, that the present invention greatly expands the field of use of beryllium metal, and shapes within the expanded field, particularly cup-shapes, free from fractures, extensive micro-cracks, and the like, can be produced thereby economically.

Having thus described our invention, we claim:

1. An apparatus for hot forming metal billets into preselected shapes and comprising a female die member having a rigid imperforate base for supporting a billet and a peripheral wall extending away from the base and defining therewith an open end die cavity, a pressure ram member, means supporting said members for movement relative toward and away from each other along a predetermined path, said ram member having a peripheral wall and, upon said relative movement of the members toward each other, being receivable endwise in said cavity through the open end of the cavity with the peripheral wall of the ram member spaced from the peripheral wall of the cavity a substantial amount more than operating clearance for receiving metal from a heated billet in the cavity when the billet is placed under pressure in the cavity by movement of the ram toward fully inserted position, a metal restrainer disposed initially wholly within the cavity and having at one end an outer face facing away from the base and toward the open end of the cavity, and spaced from the base and open end, and at the other end an inner face facing toward, and spaced from, the base and open end so that at least a portion of the inner face can overlie that peripheral margin of a billet in, and facing toward the open end of, the cavity when the billet is being formed in the cavity by the ram member, said restrainer substantially bridging the space between the peripheral walls before the ram is fully inserted in the cavity, said restrainer being capable, when heated to the temperature of the billet to be formed, of deformation in a direction away from the base by pressure of billet metal flowing in the cavity due to pressure exerted on the metal by the ram member, constraining means on at least one of the members and positively engageable with part of the restrainer, upon said relative movement of the ram member endwise in the cavity toward the base for pressure forming the billet, for restraining bodily movement of the restrainer and limiting movement of said overlying portion of the restrainer in a direction away from said base to movement due to said deformation of the restrainer and to a sufficient distance to permit displacement of part of the heated billet metal from the cavity into part of said space, by the pressure of the metal of the billet being displaced by the ram member when the ram member is forced under pressure fully into the cavity.

2. An apparatus according to claim 1 wherein the restrainer is a metal annulus having a central passage and the ram member extends through the central passage of the annulus.

3. The apparatus according to claim 1 wherein the restrainer is in the form of a plate which has a thickened rim which is at least coextensive in radial dimension with the space between the peripheral walls of the members.

4. An apparatus according to claim 1 wherein the constraining means includes a portion on the ram member operative to expand the restrainer while it is within the cavity generally transversely of the path of the ram member during the initial insertion of the ram member into the cavity.

5. An apparatus according to claim 4 wherein said portion is provided by the peripheral wall of the ram member which tapers inwardly of the axis of the ram member in a direction toward the base of the cavity.

6. The method of hot forming a metal billet comprising confining the billet in an open end die cavity having an imperforate bottom wall and peripheral wall, applying sufficient force to the upper face of the billet in a direction toward the bottom wall in inwardly spaced relation from the peripheral wall so as to cause the metal of the billet to flow so that part of the metal conforms to the end wall and the peripheral wall adjacent thereto, and part to back extrude in annular form opposite to the direction of application of said force, and, during said back extrusion, positively constraining the annular portion, at at least one of its peripheries, from movement opposite from said direction of application of pressure while leaving the annular portion between and spaced from the peripheral walls of the annular portion free from said positive constraint, and concurrently applying yieldable resisting force to the last mentioned portion in a direction toward the bottom of the wall for maintaining sufficient back pressure to assure compaction of the metal so as to eliminate minor cracks, splits, and fractures in the formed billet.

References Cited by the Examiner

UNITED STATES PATENTS

| 2,028,996 | 1/36 | Sautier | 29—535 |
| 2,653,494 | 9/53 | Crentz | 207—10.3 |
| 2,755,543 | 7/56 | Dunn et al. | 207—6.1 |
| 2,986,273 | 6/61 | Bardgett | 207—10.5 |
| 3,127,671 | 4/64 | Hayes | 29—423 |

FOREIGN PATENTS

| 755,107 | 3/53 | Germany. |
| 887,435 | 8/53 | Germany. |

CHARLES W. LANHAM, *Primary Examiner.*

WILLIAM W. DYER, Jr., MICHAEL V. BRINDISI, *Examiners.*